Aug. 12, 1969  H. B. SCHULTHEIS, JR  3,460,382
COAXIAL LOAD CELL
Filed Dec. 23, 1966

INVENTOR
HARRY B. SCHULTHEIS, JR.
BY *Elliott & Pastoriza*
ATTORNEYS

United States Patent Office 3,460,382
Patented Aug. 12, 1969

3,460,382
COAXIAL LOAD CELL
Harry B. Schultheis, Jr., Woodland Hills, Calif., assignor to W. C. Dillon & Company, Inc., a corporation of California
Filed Dec. 23, 1966, Ser. No. 604,458
Int. Cl. G01l 5/12
U.S. Cl. 73—141        1 Claim

ABSTRACT OF THE DISCLOSURE

An improved load cell for measuring forces such as in weighing operations up to the order of thousands of pounds, and is characterized by being extremely compact and yet providing a very accurate indication of the force being measured. Essentially, the structure includes a cup-shaped member and a column member coaxially received within the cup. The cup is supported at its upper periphery so that its closed bottom end hangs freely. The column is arranged to receive an applied force to be measured at its upper end and transmit this force to the bottom closed end of the cup. The column is thus placed in compression and the wall of the cup placed in tension. Strain gauges are attached to the cup wall and column, the strain gauges on the wall being placed in tension and the strain gauges on the column being placed in compression. These gauges are connected into an electrical bridge to provide an output signal representing a function of the force applied to the center column. The coaxial arrangement and the fact that the strain gauges are disposed in opposite arms of an electrical bridge and function in opposite senses result in a compact cell having a relatively high output signal for small changes in the applied force.

---

There are presently available many types of load cells or measuring devices which will provide a signal on a meter or a recorder indicating the magnitude of a force applied to the cell. In many instances, the load cell itself simply constitutes a deformable member to which a strain gauge is attached. The force is applied to this member and its degree of deformation is detected by the strain gauge, the resulting signal being a function of the deformation and thus of the applied force.

It is the primary purpose of the present invention to provide an improved arrangement for a load cell wherein relatively high forces can be accurately measured and yet the load cell configuration itself kept fairly compact, all to the end that the load cell may be easily accommodated to a number of different applications.

The foregoing is achieved by providing a coaxial arrangement of first and second load members together with suitable strain gauges so interrelated that when a force to be measured is applied, one of the load members is placed in tension and the other in compression. Opposite signals can thus be derived from the strain gauges involved and by connecting these strain gauges into opposite arms of an electrical bridge, there results four active arms in the bridge with pairs working in opposite senses so that the net output signal is considerably greater than would be the case were only a single load member employed with strain gauges.

In the preferred embodiment, one of the load members is in the form of a cup having a cylindrical wall of a given cross-sectional area. The second load member constitutes a column of substantially equal cross-sectional area received coaxially within the cup so that a compact configuration results. The force to be measured is applied to the upper end of the column and is transmitted to the lower closed end of the cup so that the column is placed in compression and the cup wall in tension. Suitable bearing means are provided for holding the column centered and yet permitting slight axial movements of the column to accommodate the deformation of the column and cup wall upon application of a force to the upper end of the column. The strain gauges are secured directly to the cup wall and to the column and these are connected in opposite arms of an electrical bridge in such a manner as to provide an output signal representing a function of the deformation and thus of the applied force.

A better understanding of the invention will be had by now referring to the accompanying drawings, in which.

Figure 1:
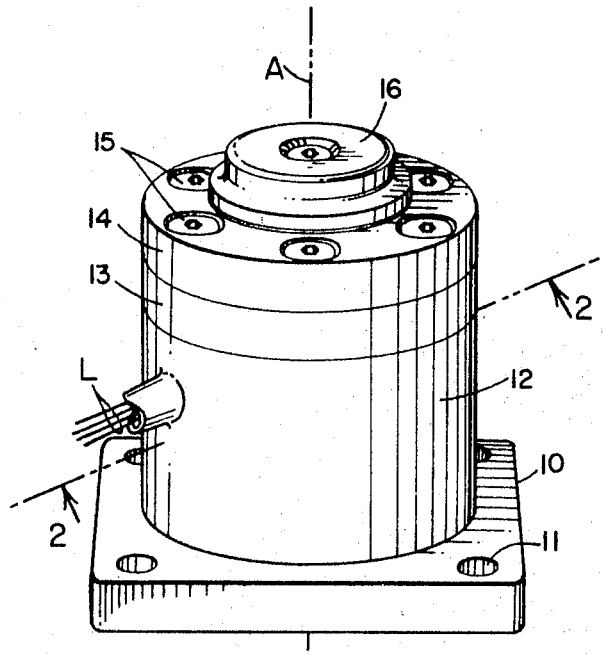
FIGURE 1 is a perspective view of the coaxial load cell of this invention.

Referring first to FIGURE 1, there is shown a base mounting plate 10 which may be provided with suitable bolt holes 11 for securing the same to a stationary surface. A mounting means in the form of an outer cylindrical supporting wall 12 extends upwardly from the base plate 10 and serves to support a peripheral flange 13 constituting the upper portion of a first load member within the support 12, all of which will become clear as the description proceeds. Above the flange 13 there is provided a bearing means also functioning as a top cap or cover for the assembly. The bearing means or cover 14 includes a plurality of fastening bolts 15 which extend downwardly through the flange 13 into the supporting wall 12 to hold the interior assembled components together. Also illustrated in FIGURE 1 is the upper end portion 16 of a second load member coaxially disposed along the axis A to extend within the outer cylindrical wall 12.

Forces to be measured are applied to the upper end of the second load member and suitable signals are derived from output leads L extending through one side of the outer supporting cylindrical wall 12. These signals will provide an indication of the magnitude of the force applied to the upper end 16.

Figure 2:
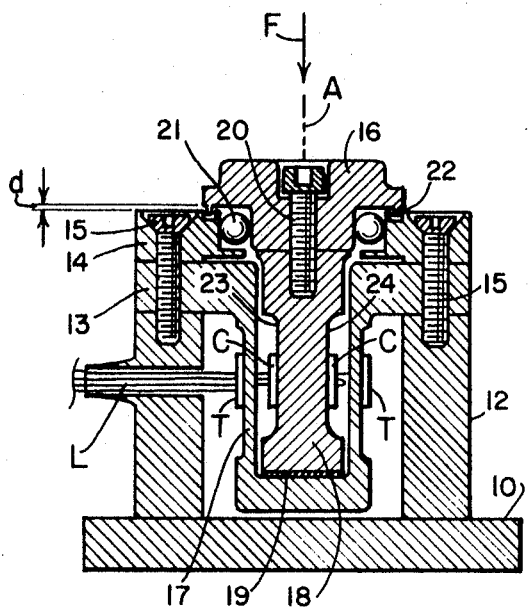
FIGURE 2 is a cross-sectional view taken in the direction of the arrows 2—2 of FIGURE 1; and, FIGURE 3 is a simple, schematic, electrical circuit diagram for deriving an output signal from the structure illustrated in FIGURE 2.

The foregoing arrangement will be clearer by now referring to the cross section of FIGURE 2 wherein it will be noted that the flange 13 referred to in FIGURE 1 constitutes the upper peripheral portion of a first load member in the form of a cup 17 having a cylindrical wall coaxially disposed with respect to the outer supporting wall 12. The second load member in turn extends downwardly from its upper end 16 in the form of a column 18 coaxially received within the cup 17 and arranged to transmit a force F to the lower closed end of the cup, preferably through the medium of an insert 19. The insert 19 is of a material different from the material of the cup and column so that the problem of molecular interface diffusion resulting from pressure contact between similar metals is avoided. For example, the cup and column may constitute aluminum and the insert 19 constitute stainless steel.

A bolt 20 serves to secure the upper end 16 to the main portion 18 of the column. The bearing means 14 alluded to in FIGURE 1, serves to define an outer bearing race structure for ball bearings 21 which cooperate with the upper end 16 of the column member to guide the column member 16 in very slight up and down movements. In this respect, the balls 21 will hold the column member in coaxial relationship with respect to the cup 17 and will at the same time, resist mutual misalignment of the cup and column portions due to transverse or off-center forces acting upon the load member 16. In this respect, only the force exerted along the axis A will be measured.

It will be noted that the upper end of the bearing structure 14 also includes an annular groove arranged to receive an annular rib 22 extending downwardly from an increased diameter overlying portion of the upper end 16. This structure provides a dust trap to protect the bearings and the interior of the load cell.

The geometry of the arrangement as illustrated in FIGURE 2 is such that there is provided a small distance $d$ between the overlying increased diameter end portion of the end 16 and the top surface of the bearing means. This top surface of the bearing means thus serves as a stop to limit downward movement of the column into the cup to the distance $d$.

Suitable strain gauge means in the form of first and second pairs of strain gauges designated T and C respectively are secured to the cup wall and column members. Preferably, the strain gauges T which function to measure tension are secured to diametrically opposite walls of the cup and the strain gauges C, which are employed to measure compression, are secured to diametrically opposite walls of the column. Leads from the strain gauges indicated at L pass from the structure as described in conjunction with FIGURE 1.

Figure 3:
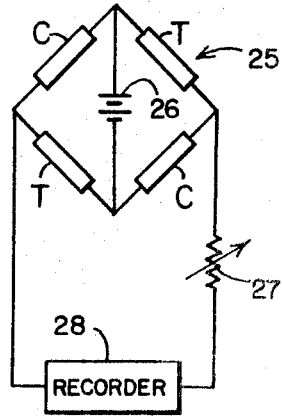

Referring now to FIGURE 3, there is illustrated at 25 an electrical bridge for the various strain gauges. It will be noted that the tension strain gauges are connected in opposite arms of the bridge and the compression strain gauges connected into the remaining opposite arms. A suitable source of energy schematically depicted by a battery 26 connects to diagonally opposite corners of the bridge, the other diagonally opposite corners connecting through a suitable calibrating variable resistance 27 to a recorder 28. The electrical bridge is conventional but because of the dual load cell arrangement, described in FIGURE 2, each of the four arms constitutes an active arm so that the output signal applied to the recorder 28 is substantially twice as large as would be the case were only two of the arms active.

In the operation of the cell, assume that a force F is applied to the upper end portion 16 of the column of the load cell. This force would be transmitted through the column 18 to the closed end of the cup 17 thereby placing the column in compression and the annular wall of the cup in tension. In the preferred design, the cross-sectional area of the annular wall 17 is made substantially equal to the cross-sectional area of the column 18 so that the degree of deformation recorded by the tension and compression strain gauges respectively is substantially equal.

With references to FIGURE 3, when the strain gauges C are placed in compression, their resistance values will vary in like directions and, similarly, when the strain gauges T are placed in tension, their resistance values will vary in like directions but in an opposite sense to that of the resistances of the strain gauges C. As a consequence, there will be developed a potential difference at the diagonally opposite points of the bridge to which the recorder 28 is connected and this signal will be recorded by the recorder 28. The recorder may be set to a desired deflection by means of the calibrating variable resistance 27 under a maximum or predetermined load condition.

From the foregoing description, it will be evident that the present invention has provided a greatly improved load cell which is extremely compact as a consequence of the coaxial configuration and yet wherein the output signal is relatively large.

What is claimed is:

1. A coaxial load cell including, in combination: a cup member having a cylindrical wall of given transverse cross-sectional area and a lower closed end; mounting means supporting the upper peripheral portion of said cup member such that its lower closed end is hanging freely, said mounting means including an outer cylindrical support wall coaxial with respect to said cup member, the upper peripheral portion of said cup member having a laterally extending flange overlying and secured to the upper end of said supporting wall, the lower end of said supporting wall terminating in a base plate at a point below the lower closed end of said cup member; a column member extending coaxially downwardly into said cup in a position to transmit a force coaxially applied to the upper end of said column such that said cylindrical wall of said cup is placed in tension and said column is placed in compression; an insert member disposed between the bottom of said column and the closed end of said cup for transmitting said force to said cup, said insert being of dissimilar material than said column and cup; bearing means secured to the upper end of said flange and defining a coaxial annular bearing through which the upper end of said column member extends; ball bearings disposed in said annular bearing such that small movement of said column member in up and down axial directions is guided by said ball bearing to hold said column in coaxial relationship relative to said cup member, the transverse cross-sectional area of said column corresponding to said given transverse cross-sectional area of said cylindrical wall, the upper end of said column including an increased diameter portion overlying and axially spaced upwardly from the upper end of said bearing means to define a stop means limiting the downward extent of movement of said column, said increased diameter portion including an annular downwardly extending rib, the opposed upper end of said bearing means including an annular groove receiving said rib to define an annular dust trap; and first and second strain gauge means secured respectively to said cylindrical wall and to said column, whereby said strain gauge means may be connected in a circuit to provide a signal constituting a function of said force.

References Cited

UNITED STATES PATENTS

| 2,472,047 | 5/1949 | Ruge | 73—141 |
| 2,645,121 | 7/1953 | Scott | 73—144 |
| 2,814,946 | 12/1957 | Harris | 73—141 |
| 3,057,202 | 10/1962 | Dumas | 73—398 |
| 3,297,971 | 1/1967 | Gindes | 73—141 XR |

FOREIGN PATENTS

| 1,315,183 | 12/1962 | France. |

RICHARD C. QUEISSER, Primary Examiner

C. A. RUEHL, Assistant Examiner

U.S. Cl. X.R.

177—211